(12) United States Patent
Taniguchi et al.

(10) Patent No.: US 8,519,649 B2
(45) Date of Patent: Aug. 27, 2013

(54) CONTROL DEVICE OF A SYNCHRONOUS MOTOR

(75) Inventors: Shun Taniguchi, Tokyo (JP); Kazuya Yasui, Kanagawa-ken (JP); Kazuaki Yuuki, Saitama-ken (JP); Yosuke Nakazawa, Tokyo (JP)

(73) Assignee: Toshiba Corporation, Tokyo (JP)

( * ) Notice: Subject to any disclaimer, the term of this patent is extended or adjusted under 35 U.S.C. 154(b) by 20 days.

(21) Appl. No.: 13/198,607

(22) Filed: Aug. 4, 2011

(65) Prior Publication Data

US 2011/0285337 A1    Nov. 24, 2011

Related U.S. Application Data

(63) Continuation of application No. PCT/JP2011/002783, filed on May 17, 2011.

(30) Foreign Application Priority Data

May 20, 2010    (JP) ................................ P2010-116601

(51) Int. Cl.
    *H02P 21/00* (2006.01)

(52) U.S. Cl.
    USPC ................. 318/400.02; 318/700; 318/400.01; 318/400.14; 318/721; 318/801; 388/804; 388/811

(58) Field of Classification Search
    USPC ............. 318/400.01, 400.02, 400.14, 400.15, 318/779, 799, 800, 801, 727, 599, 432, 400.26, 318/700, 721, 722, 808, 809, 811, 823, 430, 318/434, 437, 543; 388/804, 811
    See application file for complete search history.

(56) References Cited

U.S. PATENT DOCUMENTS

| | | | | |
|---|---|---|---|---|
| 6,401,875 B1 * | 6/2002 | Marvin et al. | ................ | 187/393 |
| 7,294,988 B2 * | 11/2007 | Ajima et al. | .................. | 318/712 |
| 7,482,777 B2 * | 1/2009 | Tomigashi | .................... | 318/807 |
| 7,504,797 B2 * | 3/2009 | Tomigashi et al. | ........... | 318/807 |
| 7,548,038 B2 * | 6/2009 | Atarashi et al. | ............... | 318/494 |
| 7,893,639 B2 * | 2/2011 | Tomigashi | ............... | 318/400.21 |
| 8,022,660 B2 * | 9/2011 | Kinpara et al. | ............... | 318/812 |

FOREIGN PATENT DOCUMENTS

| | | |
|---|---|---|
| JP | 07-177788 | 7/1995 |
| JP | 11-018483 | 1/1999 |
| JP | 11-075394 | 3/1999 |
| JP | 2008-017690 | 1/2008 |

* cited by examiner

*Primary Examiner* — Antony M Paul
(74) *Attorney, Agent, or Firm* — Baker Botts L.L.P.

(57) ABSTRACT

A control device of a synchronous machine is disclosed. The control device includes an inverter configured to provide an output current to a synchronous machine. A controller configured to control the output current and to estimate a voltage command, at least in part, by using pulse width modulation to choose a non-zero vector at a time when the inverter is not driving the synchronous machine with the output current. The estimating the voltage command is performed without using a zero vector. A phase angle and angular velocity estimating section configured to estimate a phase angle and an angular velocity of a rotor of the synchronous machine based, at least in part, on an inductance value, an induction voltage value, the voltage command, and the output current. The controller is further configured to control the output current based, at least in part, on the phase angle and the angular velocity.

14 Claims, 15 Drawing Sheets

CONTROL DEVICE OF A SYNCHRONOUS MOTOR

CROSS-REFERENCE TO RELATED APPLICATIONS

This application is a continuation of International Application No. PCT/JP2011/002783, filed May 17, 2011, which is based upon and claims the benefit of priority from Japanese Patent Application No. 2010-116601, filed May 20, 2010, both of which are incorporated herein by reference.

FIELD

Embodiments described herein relate generally to a control device of a synchronous motor.

BACKGROUND

In the sensorless control device of a synchronous motor, many methods have been proposed as a restart method from a free-run state. A free-run state is a state in which a rail car is performing a coasting operation. The coasting operation is a state in which the notch command from a driver's seat is 0 and all switching element gate commands of an inverter are OFF.

Phase angle estimation methods may use induction voltage when vehicle speed is high, and may further involve a method of zero current control and a method of using a short-circuit current. Phase angle estimation methods may use inductance when vehicle speed is low. There is also a phase angle estimation method which chooses a suitable technique according to motor angular velocity using both the method using induction voltage and the method using inductance. By using these methods, starting from the state of a free run is possible.

Neither of the phase angle estimation methods can be started in a full speed region only by a single technique. Therefore, it is necessary to combine a plurality of phase angle estimation methods in the case of phase angle estimation. When phase angle estimation methods are combined in order to try starting with a plurality of phase estimation methods, the time which the reboot of an inverter takes becomes remarkably long in the worst case.

And, in order to use combined phase angle estimation methods, there is a problem of the starting sequence becoming complicated. The reboot time of an inverter is the time from when a torque (current) command occurs until the real angle and presumed angle of a motor rotor are in agreement and torque occurs on a motor. The reboot time greatly influences the response after giving a torque command. Usually, shortening the time in the worst case leads to improvement in a response.

In a system having a load contact machine between an inverter and a synchronous motor, it is possible to carry out a free run with a load contact machine in an open state when no-load induction voltage is more than the voltage of a direct current side of an inverter (a state hereinafter called a high-voltage state). In the case of the reboot of an inverter, the voltage of a direct current side of an inverter may turn into excess voltage from a free-run state with no-load induction voltage. Therefore, it is necessary to enable starting safely in the high-voltage state.

SUMMARY

The present disclosure generally relates to a control device of a synchronous motor.

In one aspect, a control device of a synchronous machine is disclosed. An inverter is configured to provide an output current to a synchronous machine. A controller is configured to control the output current and to estimate a voltage command, at least in part, by using pulse width modulation to choose a non-zero vector at a time when the inverter is not driving the synchronous machine with the output current. The estimating the voltage command is performed without using a zero vector. A phase angle and angular velocity estimating section is configured to estimate a phase angle and an angular velocity of a rotor of the synchronous machine based, at least in part, on an inductance value, an induction voltage value, the voltage command, and the output current. The controller is further configured to control the output current based, at least in part, on the phase angle and the angular velocity.

In another aspect, a method of controlling a synchronous machine is disclosed. The method includes configuring an inverter to provide an output current to a synchronous machine. The method further includes estimating a voltage command, at least in part, by using pulse width modulation to choose a non-zero vector at a time when the inverter is not driving the synchronous machine with the output current. The estimating of the voltage command is performed without using a zero vector. The method further includes estimating a phase angle and an angular velocity of a rotor of the synchronous machine based, at least in part, on an inductance value, an induction voltage value, the voltage command, and the output current. And, the method includes controlling of the output current based, at least in part, on the phase angle and the angular velocity.

The features and advantages of the present disclosure will be apparent to those skilled in the art. While numerous changes may be made by those skilled in the art, such changes are within the spirit of the disclosure.

BRIEF DESCRIPTION OF THE DRAWINGS

The accompanying figures, which are incorporated in and constitute a part of the specification, illustrate embodiments of the present disclosure and together with the general description given above and the detailed description of the embodiments given below, serve to explain the principles of the present disclosure.

DETAILED DESCRIPTION

Various embodiments will be described hereinafter with reference to the accompanying figures.

Embodiment 1

Figure 1:
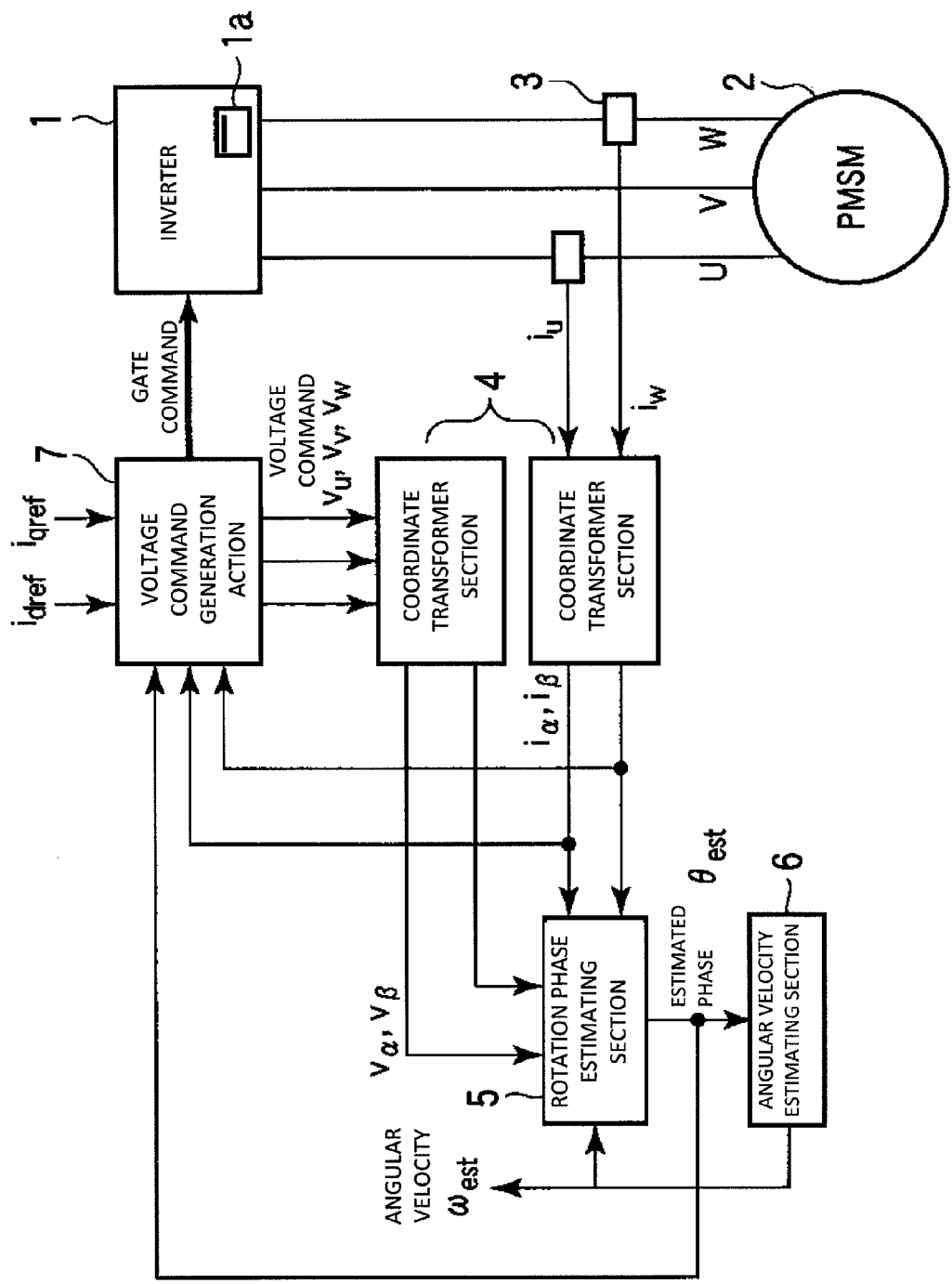
FIG. 1 is a block diagram showing the system configuration of a first embodiment of the present invention.

FIG. 1 is a block diagram showing certain features of a first embodiment of the sensorless control device of a synchronous motor. Inverter 1 receives a gate command for driving the inverter 1. Inverter 1 switches ON/OFF of main circuit switching elements according to the gate command. Inverter 1 transforms direct current to alternating current by switching the switching elements.

Motor 2 is a permanent magnetic synchronous motor (hereinafter indicated as PMSM). A magnetic field occurs according to the three-phase alternating current which flows into each magnetization phase. And motor 2 generates torque by a magnetic interaction with a rotor (not shown). Current detecting section 3 detects current response of two phases or three phases among the three phases alternating current which flows into motor 2. As depicted in FIG. 1, the current detecting section 3 detects the current of two phases.

Coordinate transformer section 4 transforms U, V, and W 3-phase fixed coordinates into αβ-axes fixed coordinates. The α-axis shows the U-phase winding axis of motor 3. The β-axis intersects the α-axis at a right angle. Rotation phase estimating section 5 estimates rotor phase angle $\theta_{est}$ of motor 3 with using $i_\alpha$ and $i_\beta$ which are inputted by coordinate transformer section 4.

Angular velocity estimating section 6 estimates angular velocity $\omega_{est}$ with using rotor phase angle $\theta_{est}$ which is inputted by rotation phase estimating section 5. For example, there is a means to estimate angular velocity $\omega_{est}$ according to the time differentiation of estimated phase $\theta_{est}$. And there is a means to estimate angular velocity $\omega_{est}$ by PLL (Phase-Locked Loop) by using the difference of estimated phase $\theta_{est}$ and the phase currently calculated.

Current command $i_{dref}$ and $i_{qref}$ are inputted to voltage command generation section 7. Voltage command generation section 7 estimates gate command with using $i\alpha$, $i\beta$, $i_{dref}$ and $i_{qref}$. Although a phase and angular velocity are estimated by fixed coordinates here, it may estimate by rotational coordinates.

The phase estimation method of rotation phase estimating section 5 is explained in detail. The general voltage equation on the dq-axes of salient pole type PMSM like electric motor 2 is shown in an equation (1). The d-axis is set as the direction of magnetic flux of the rotor of an electric motor. The q-axis intersects the d-axis at a right angle.

$$\begin{bmatrix} v_d \\ v_q \end{bmatrix} = \begin{bmatrix} R_m + pL_d & -\omega L_q \\ \omega L_d & R_m + pL_q \end{bmatrix} \begin{bmatrix} i_d \\ i_q \end{bmatrix} + \Phi_f \omega \begin{bmatrix} 0 \\ 1 \end{bmatrix} \quad (1)$$

$v_d$ and $v_q$ are d-q-axis armature voltages. $i_d$ and $i_q$ are dq-axis armature currents. $R_m$ is the winding resistance. $L_d$ and $L_q$ are dq-axis inductance. $\omega$ is d-q-axis rotor angular velocity. $\Phi_f$ is a magneto magnetic flux coefficient, and p (=d/dt) is a differential operator.

The inductance $L_d$ and $L_q$ are values peculiar to a motor. Induction voltage is extended so that the inductance of the diagonal ingredient of the first matrix of the right-hand side of a formula (1) and a reverse diagonal ingredient may become the same. Position information is centralized on an induction voltage ingredient, and it enables it to calculate phase θ by extending induction voltage. Extension of induction voltage will show the voltage equation of an equation (1) by a formula (2).

$$\begin{bmatrix} v_d \\ v_q \end{bmatrix} = \begin{bmatrix} R_m + pL_d & -\omega L_q \\ \omega L_q & R_m + pL_d \end{bmatrix} \begin{bmatrix} i_d \\ i_q \end{bmatrix} + \begin{bmatrix} 0 \\ (L_d - L_q)(\omega i_d - p i_q) + \omega \Phi_f \end{bmatrix} \quad (2)$$

It will become a formula (3) if coordinate conversion of the formula (2) is carried out to αβ coordinates.

$$\begin{bmatrix} v_\alpha \\ v_\beta \end{bmatrix} = \begin{bmatrix} R_m + pL_d & -\omega(L_q - L_d) \\ \omega(L_q - L_d) & R_m + pL_d \end{bmatrix} \begin{bmatrix} i_\alpha \\ i_\beta \end{bmatrix} + E_{0x} \begin{bmatrix} -\sin\theta \\ \cos\theta \end{bmatrix} \quad (3)$$

$v_\alpha$ and $v_\beta$ are αβ axes armature voltages. $i_\alpha$ and $i_\beta$ are αβ-axes armature currents. The extended induction voltage (extended induction voltage $E_{0x}$) is shown by a formula (4).

$$\begin{aligned} E_{0x} &= (L_d - L_q)(\omega i_d - p i_q) + \omega \Phi_f \\ &= (L_d - L_q)(\omega(i_\alpha \cos\theta + i_\beta \sin\theta) - p(-i_\alpha \sin\theta + i_\beta \cos\theta)) + \omega \Phi_f \end{aligned} \quad (4)$$

From a formula (3), phase θ is calculable by a formula (5).

$$\begin{cases} e_\alpha = -E_{0x}\sin\theta = v_\alpha - (R_m + pL_d)i_\alpha - \omega(L_d - L_q)i_\beta \\ e_\beta = E_{0x}\cos\theta = v_\beta + \omega(L_d - L_q)i_\alpha - (R_m + pL_d)i_\beta \\ \theta = -\tan^{-1}(e_\alpha / e_\beta) \end{cases} \quad (5)$$

As long as such phase estimation is the method of using both induction voltage and inductance, other estimation methods may be used for it. As shown in a formula (4), $E_{0x}$ becomes only a differentiation paragraph of q-axis current, when angular velocity ω is small.

If $E_{0x}$ becomes small, when calculating phase θ by a formula (5), an error becomes large, and it cannot be estimated with sufficient accuracy. However, if a current differentiation paragraph is enlarged, a phase can be estimated with sufficient accuracy from a low speed to a high speed. That is, for example in the first formula of a formula (4), if current differentiation paragraph $pi_q$ is large, $E_{0x}$ will become large. And the estimating accuracy of phase θ shown by a formula (5) goes up, and a phase can be estimated now with sufficient accuracy from a low speed to a high speed.

Next, voltage command generation section 7 related to one embodiment of the present invention is explained. Current tracking type PWM (pulse width modulation)—to which the direct development of the PWM signal is carried out, for example so that the instantaneous value of inverter output current may follow a standard value—is used for voltage command generation section 7. An example of the control action of current tracking type PWM is indicated in Japanese Patent 3267528. In current tracking type PWM, in order to enlarge a current differentiation paragraph as mentioned above so that a phase can be estimated with sufficient accuracy, by this embodiment, only a non-zero voltage vector is chosen as a voltage vector. A detailed selection method is shown in FIG. 2.

Figure 2:
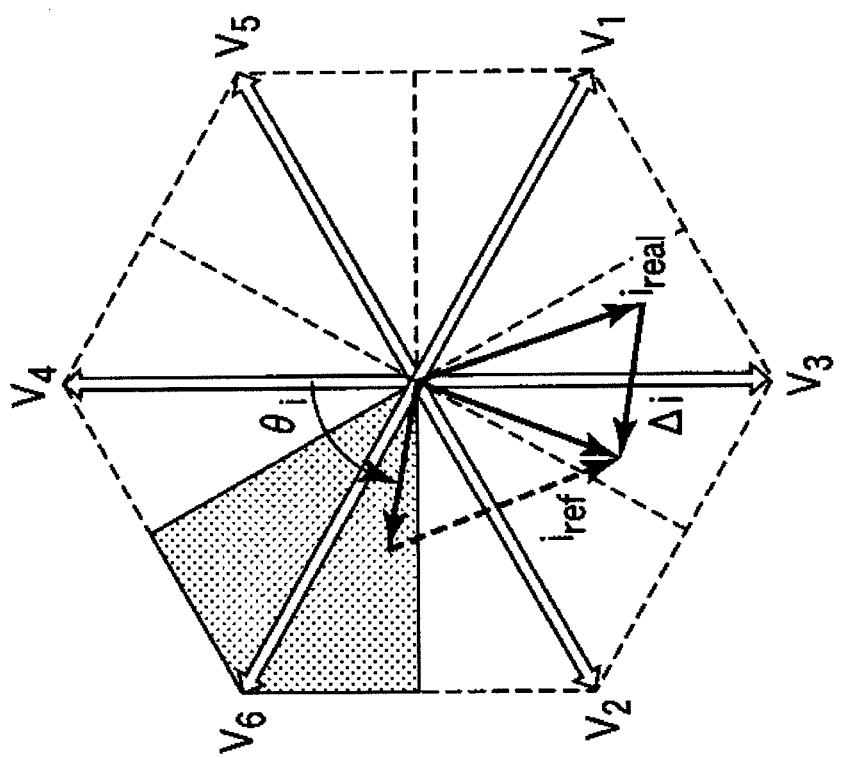
FIG. 2 is a vector diagram showing the voltage vector selection method according to a first embodiment.

FIG. 2 shows output voltage vectors $V_1$-$V_6$ (voltage vector command) of inverter 1. In addition to this, inverter 1 can take $V_0$ and $V_7$ as an output voltage vector. When $V_2$-$V_7$, and $V_0$ are denoted by the gating signal of UVW, they are respectively (011), (100), (101), (110), (111), (000), and (010). Since the voltage between phases of UVW is in 0V, $V_0$ and $V_7$ call it a zero voltage vector. On the other hand, voltage vectors $V_1$-$V_6$ are called non-zero voltage vectors. While inverter 1 is outputting zero voltage vector $V_0$ or $V_7$, current changes only with the induction voltage of a rotor and the amount of change is small. Therefore, according to this embodiment, in order to enlarge a current differentiation paragraph at the time of starting from a free run, only a non-zero voltage vector is chosen as a voltage vector.

In FIG. 2, difference $\Delta$ of current instruction vector $i_{ref}$ and detection current phasor $i_{real}$ is calculated first. Current command vector $i_{ref}$ is a current phasor of αβ-axes current command values $i_{\alpha ref}$ and $i_{\beta ref}$ which carried out coordinate conversion of the dq-axes current command values $i_{dref}$ and $i_{qref}$ according to estimated phase $\theta_{est}$. Detection current phasor $i_{real}$ is a current phasor of αβ-axis detection current $i_\alpha$ and $i_\beta$.

Figure 3:
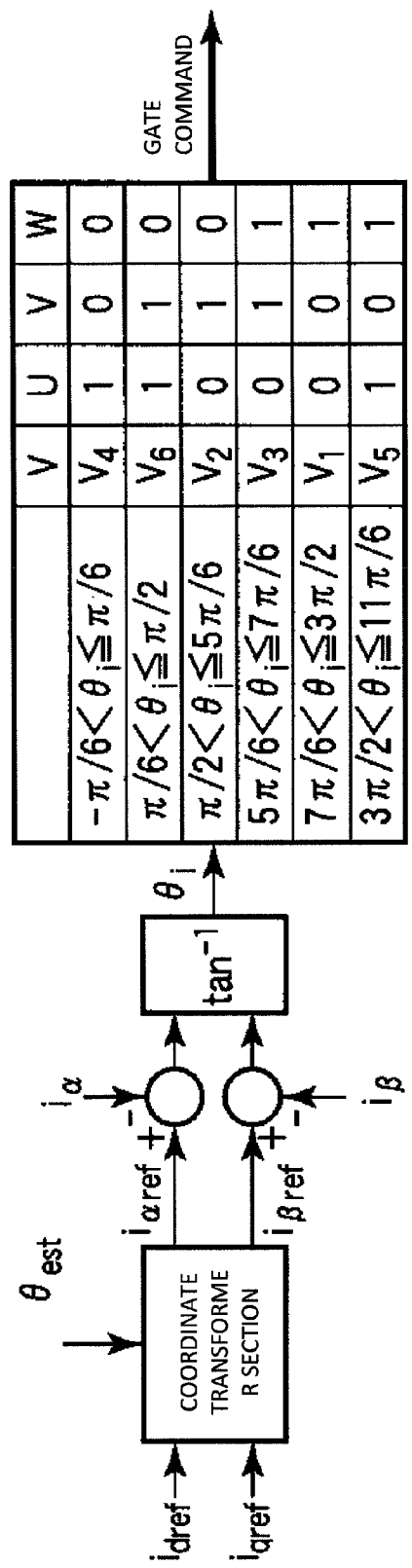
FIG. 3 is a block diagram showing the voltage vector selection method according to a first embodiment.

Angle θ of Δi is calculated as shown in the left-hand side of FIG. 3, and the voltage vector nearest to the direction is chosen (FIG. 2 $V_6$). It is because detection current phasor $i_{real}$ will approach current command vector $i_{ref}$ if a voltage vector (in a figure $V_6$) is chosen so that difference current Δi may flow. This sequence is shown in the right-hand side of FIG. 3.

According to this embodiment, at the time of starting from a free run, zero voltage vectors $V_0$ and $V_7$ are not chosen, but one of the non-zero voltage vectors $V_1$-$V_6$ is chosen in each control cycle. A final gate command is calculated using the table shown in FIG. 3.

According to this embodiment, the direction of Δi and the nearest voltage vector were chosen as a non-zero voltage vector. However, as long as it chooses only a non-zero voltage vector, other selection methods may be used. Even if it does not choose only a non-zero voltage vector completely, the same effect will be acquired if the rate which chooses a non-zero voltage vector is enlarged.

Since this embodiment does not choose a zero voltage vector, it can enlarge a current differentiation paragraph, calculates extended induction voltage $E_{0x}$ using a formula (4), and calculates phase θ using a formula (5). Therefore, in all the speed regions, estimation of a phase and angular velocity is possible by one method from a stop to a high speed. As shown in a formula (4) and a formula (5), in this embodiment, Rotation phase estimating section 5 estimates the phase angle of a rotor using both inductance $L_d$ of a synchronous machine, $L_q$, and induction voltage $\omega \phi$ of a synchronous machine.

Next, the current command value related to this embodiment is explained. In a formula (4), $L_d$-$L_q$ becomes a negative value. Therefore, if a current differentiation paragraph is disregarded and negative current will be fed through d-axis (the direction of magnetic flux of a rotor), extended induction voltage $E_{0x}$ will become large. Therefore, the estimation precision of phase θ improves from a formula (5).

Because the current differentiation paragraph can become a value of positive/negative focusing on zero, if negative current is fed through d-axis, the average value of extended induction voltage $E_{0x}$ will become large, and its estimation precision of phase θ will improve as a whole. If negative current is not fed through d-axis in a high-voltage state at the time of starting from a free run, regeneration current may flow and the voltage by the side of a direct current of an inverter may turn into excess voltage by the no-load induction voltage by a permanent magnet rotor. Therefore, it is better to feed negative current through d-axis from the starting time.

It is better to feed negative current through d-axis in the field near a high-voltage state so that regeneration current may not flow, also when the voltage by the side of a direct current of inverter 1 changes suddenly. According to this embodiment, a negative current command is given to d-axis from the starting time for the improvement in estimation precision, and excess voltage prevention.

It is better to feed negative current through d-axis in all the fields in the above-mentioned phase estimating part. By feeding positive current through d-axis in a low-speed area, by the direction inductance of d-axis of a rotor, the phase of a voltage command vector does not change but amplitude becomes large. Therefore, in the method of estimating a phase from the phase of a voltage command vector, it can be expected that phase estimation precision improves. In such a case, a speed region is first determined based on angular velocity or no-load induction voltage.

Next, what is necessary is to feed positive current through d-axis in a low-speed area, to improve estimation precision, to feed negative current through d-axis and just to prevent excess voltage in a high-speed region. Or it is also possible to use properly not on angular velocity but on voltage. For example, outline speed can also be estimated by whether current flows at the time of a load contact machine injection like a 4th below-mentioned embodiment. If it is only the purpose of preventing excess voltage, a speed region will be first determined based on angular velocity or no-load induction voltage.

Next, what is necessary is just to carry out as negative current will be fed through d-axis and excess voltage will be prevented, if it is a high-speed region. Because the direction of d-axis is unknown above in fact, if it is not used together with the method of estimating in a short time, there is a possibility that current may flow in the direction of q-axis, and torque may occur. The effect fully comes to be acquired by combining with the method which does not choose the above-mentioned zero voltage vector which can be estimated in a full speed region in the meaning in a short time. However, even if it does not combine with the method which does not choose the above-mentioned zero voltage vector, the effect of this example is acquired. Although this embodiment indicated PMSM (Permanent Magnet Synchronous Motor), the same effect is acquired even if it is a synchronous machine which uses an electromagnet for a rotor. However, since magnetic flux cannot be adjusted in the case of the Permanent Magnet synchronous motor, and the problem of the above-mentioned magnetic flux especially produced in the case of the reboot from a free run becomes remarkable, the effect which applies the present embodiment is large.

Second Embodiment

Figure 4:
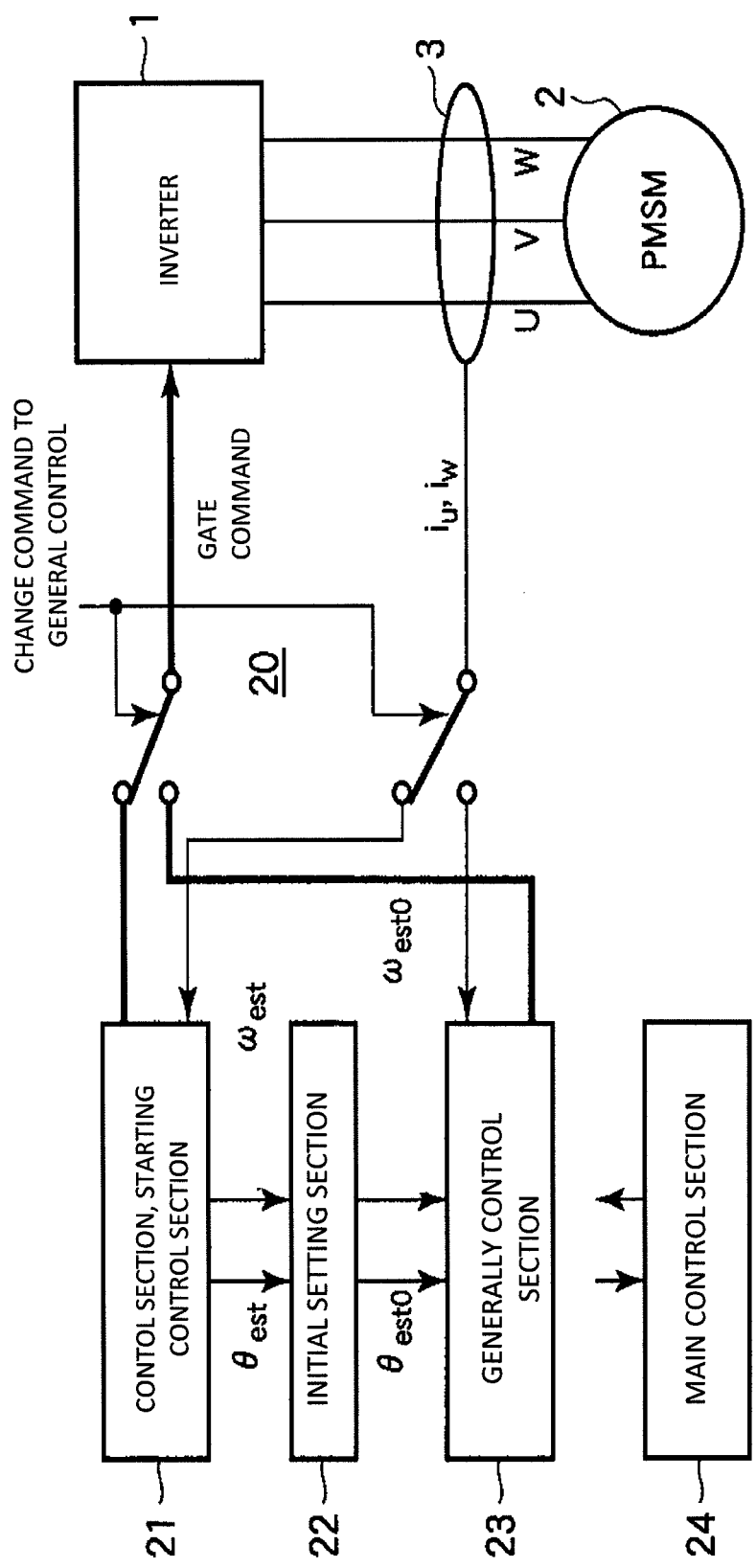
FIG. 4 is a block diagram showing the system configuration of a second embodiment of the present invention.

The motor controlling device of a second embodiment is explained. FIG. 4 is a block diagram showing certain features of a second embodiment. Since the component were explained above in the first embodiment, inverter 1, motor 2, and current detecting section 3 omit detailed explanation. Mode switch 20 is set to the control section 21 side at the time of starting at the time of starting from a free run. Mode switch 20 is a switching means which changes to the general control section 23 side after the predetermined time progress after inverter 1 starting, or after starting of inverter 1 is completed.

Starting control section 21 is a current tracking type PWM method control circuit which controls an inverter at the time of starting from a free run. General control section 23 is a voltage modulating type PWM method control circuit which controls inverter 1 at the time of the usual control after the completion of starting, or at another predetermined time. Initial-value-setting section 22 is a storage part for setting up estimated phase $\theta_{est}$ and estimated speed $\omega_{est}$ which were determined by starting control section 21. Main control section 24 is connected to starting control section 21, general control section 23, and mode switch 20. Main control section 24 controls this motor controlling device synchronously. According to this embodiment, inverter 1 is controlled by starting control section 21 only at the time of starting from a free run, and it determines estimated phase $\theta_{est}$ of motor 2, and estimated speed $\omega_{est}$. Inverter 1 is controlled by general control section 23 with using estimated phase $\theta_{est}$ of motor 2 and estimated speed $\omega_{est}$ as an initial value at the time of generally operating.

Figure 5:
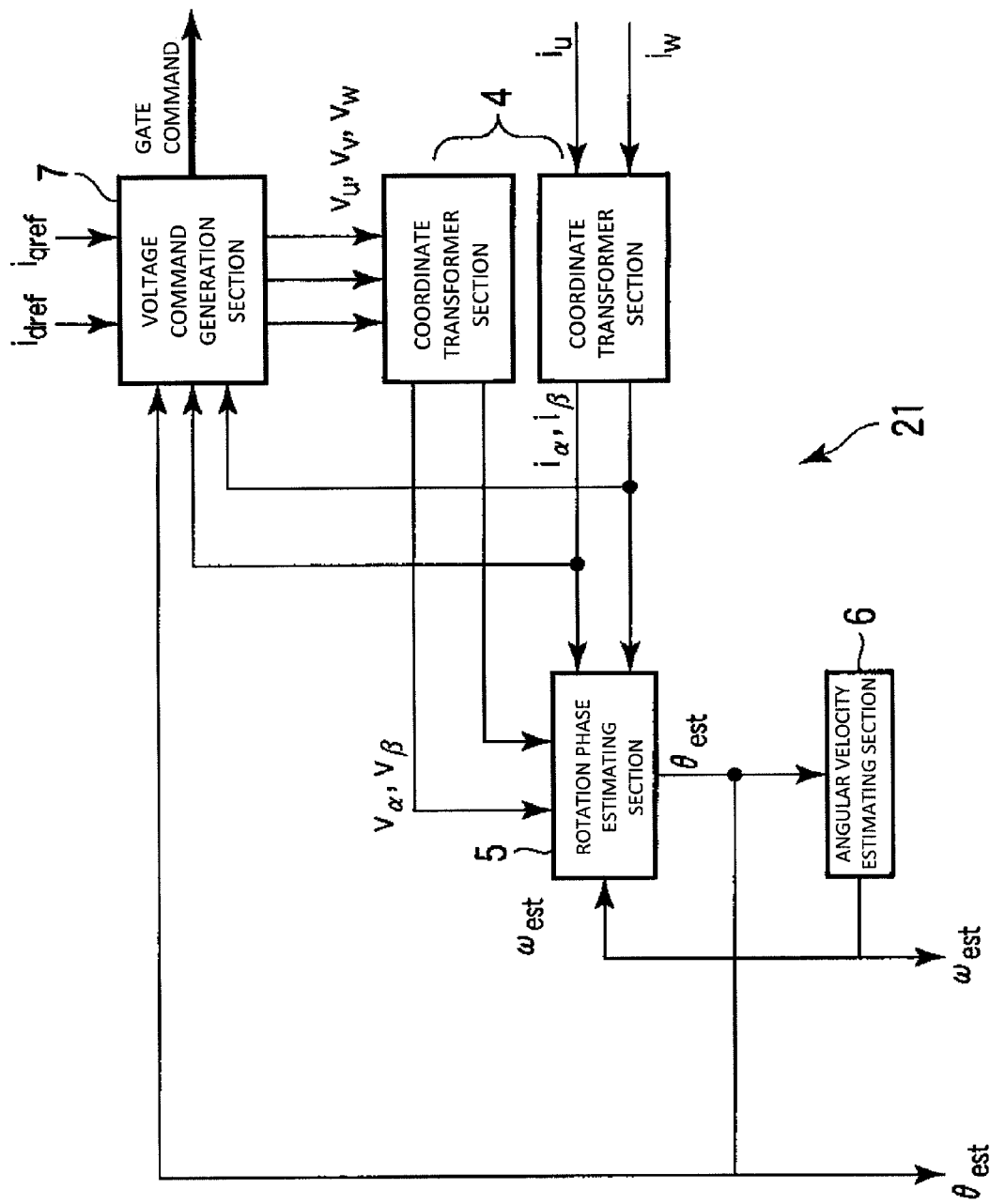
FIG. 5 is a block diagram showing certain features of control part 21 at the time of starting.

FIG. 5 is a block diagram showing certain features of starting control section 21. Because it is the same composition as the inverter control part of FIG. 1, starting control section 21 omits detailed explanation.

Figure 6:
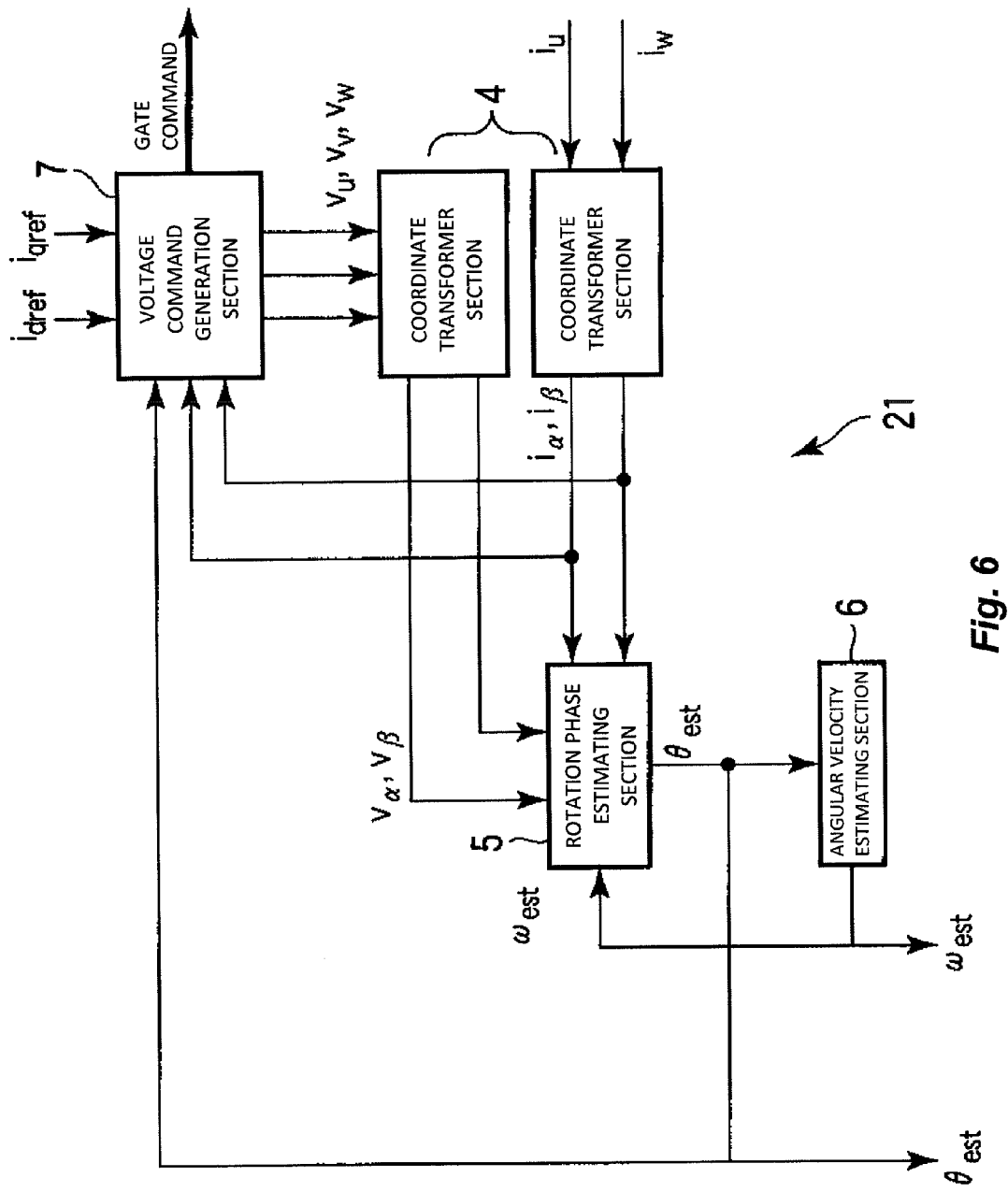
FIG. 6 is a block diagram usually showing certain features of general control section 23.

FIG. 6 is a block diagram showing certain features of general control section 23. The current response value detected in current detecting element 3 via coordinate transformation section 8 is inputted into rotation phase estimating section 5. Rotation phase estimating section 5 estimates phase difference $\Delta\theta$ of $\gamma\delta$-axis rotational coordinates with using a rotation phase angle of a synchronous machine from a current response value. $\gamma$ axis is an estimated-axis of a rotor d-axis, and $\delta$ axis is an estimated-axis which intersects perpendicularly with $\gamma$ axis.

PLL (Phase-Locked Loop) performs PI (proportional-integral) control, using phase difference $\Delta\theta$ estimated by the above-mentioned rotation phase estimating section 5, and calculates angular velocity $\omega_{est}$ of a rotor. Integrating section 25 integrates this angular velocity $\omega_{est}$ with initial estimation phase $\theta_{est0}$ as an initial value, and outputs estimated phase $\theta_{est}$.

Coordinate transformation section 8 performs coordinate conversion of 3-phase fixed coordinates and $\gamma\delta$-axis rotational coordinates using estimated phase $\theta_{est}$. Current control 10 compares the current response value ($i_\gamma$, $i_\delta$) and current command value ($i_{\gamma ref}$, $i_{deltaref}$) which were detected in the above-mentioned current detecting element, and determines voltage command value $v_\gamma$ and $v_\delta$.

Coordinate transformation section 11 performs coordinate conversion of $\gamma\delta$-axis rotational coordinates and 3-phase fixed coordinates. Chopping wave PWM modulation section 12 modulates the voltage command value (modulating rate command value) by chopping sea PWM for driving synchronous machine 2. And chopping wave PWM modulation section 12 outputs the gating signal which is the ON/OFF command of each phase switching element of inverter 1. According to this embodiment, although the phase angle is estimated by rotational coordinates, the method which estimates a phase angle with the fixed coordinates shown by Embodiment 1 may be used.

Figure 7:
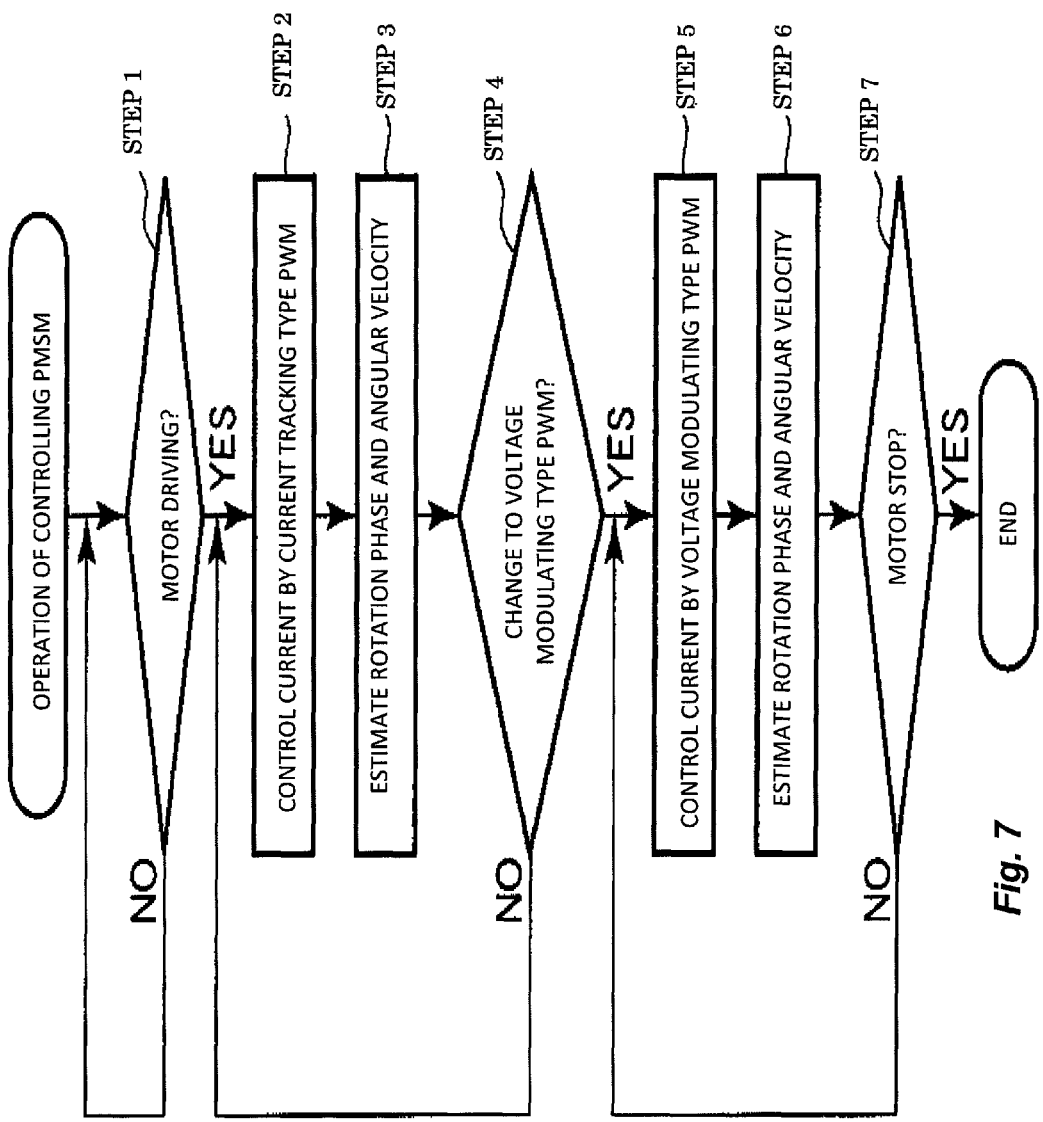
FIG. 7 is a flow chart which shows operation of a second embodiment.

FIG. 7 is a flow chart which shows operation of this embodiment. This operation is performed under control of control section 24. In Step 1, main control section 24 determines whether the motor driving command was inputted from the driver's seat (not shown), and, in motor starting, follows it to Step 2. In Step 2, current control is performed by starting control section (current tracking type PWM) 21, and motor 2 is started. Current tracking type PWM is a technique to which the direct development of the PWM signal is carried out so that the instantaneous value of inverter output current may follow a standard value. It is the feature that this current tracking type PWM has a very quick current response. Therefore, current tracking type PWM is suitable for holding down the current at the time of starting. The DC side of inverter 1 can be prevented from having excess voltage.

In Step 3, a rotation phase angle and angular velocity are estimated using the current command or the voltage command (gate command) generated by Step 2. For example, the method of using for estimation is the extended induction voltage method explained by a first embodiment. In Step 4, it is determined whether it changes to general control section (voltage modulating type PWM) 23. It may opt for this change by time, it may carry out to if phase estimation settles down, it may carry out to if torque rises, or it may be taken as if torque rises and settles down.

In Step 5, estimated phase $\theta_{est}$ and estimated speed $\omega_{est}$ which were determined by starting control section 21 are set as initial setting section 22, and mode switch 20 changes to the general control section 23 side. General control section 23 performs current control by voltage modulating type PWM using these preset values. As voltage modulating type PWM, the method which combines dq-axis current control, chopping wave comparison PWM, etc. It is a method which calculates a voltage command (modulating rate command) and performs PWM based on it by current control. In Step 6, a rotation phase angle and angular velocity are estimated using the current command or the voltage command (gate command) generated by Step 5. Another method or whichever may be sufficient as the method of using for estimation also in the same method as Step 3. As another method, the method of using induction voltage, and the method of using inductance may be used. In Step 7, it is determined whether the stop command of the motor was inputted. Control of an inverter is ended when a motor stop command is inputted.

Hereafter, the effect by a second embodiment is explained. Because a phase generally is not known when vehicles start from the state of a free run, no-load induction voltage cannot be stopped in feed-forward control. Therefore, what is necessary is just to hold down no-load induction voltage by controlling the current with a current command of the inverter. Therefore, the most effective method is raising a current control response. This can prevent current from turning into an over-current.

As a method for this, current tracking type PWM is used like this embodiment at the time of starting, for example. If voltage modulating type PWM is used when starting from the state of a free run, because a phase is not known, a voltage command cannot be given by feed-forward control. Therefore, the induction voltage by rotor magnetic flux must be stopped by the feedback control of current control.

On the other hand, it is the feature that the response of current is high, and when especially a current command ($i_{dref}$ of FIG. 5, $i_{qref}$) is zero, it can control by current tracking type PWM, without using phase information. Therefore, the starting torque shock (single shot vibration or large amplitude) and over-current in the case can be stopped by using current tracking type PWM in the case of starting. On the other hand, about the stability in a full speed region, the voltage modulating type PWM is superior to current tracking type PWM. If based on the above, a torque shock will be stopped using current tracking type PWM only at the time of starting like a second embodiment, After starting, the method of changing to voltage modulating type PWM which can realize stable sensorless control is suitable as a restart method from the free-run state in sensorless control, and it can be said that the stable reboot is realizable. As a means which raises a current control response, only voltage modulating type PWM shown, for example in FIG. 6 can be used.

In voltage modulating type PWM, a current control gain can be enlarged or switching frequency can be raised only at the time of starting, and a current control response can be raised by carrying out renewal of a voltage vector early to it. In the embodiment which raises switching frequency from usual at the time of starting, either voltage modulating type PWM or current tracking type PWM is possible. For example, combine the embodiment which uses current tracking type PWM only at the time of starting, and the embodiment which raises switching frequency at the time of starting, or, by combining the embodiment which raises switching frequency at the time of starting, and the embodiment which raises a current control gain at the time of starting, and the torque shock at the time of starting can be stopped and a current control response can be raised by it. Although this embodiment indicated PMSM, the same effect is acquired even if it is a synchronous machine which uses an electromagnet for a rotor. However, because magnetic flux cannot be adjusted like this embodiment in the case of a permanent magnet synchronous motor, the effect applied from the problem of the above-mentioned magnetic flux especially produced in the case of the reboot from a free run becoming remarkable is large.

Third Embodiment

Figure 8:
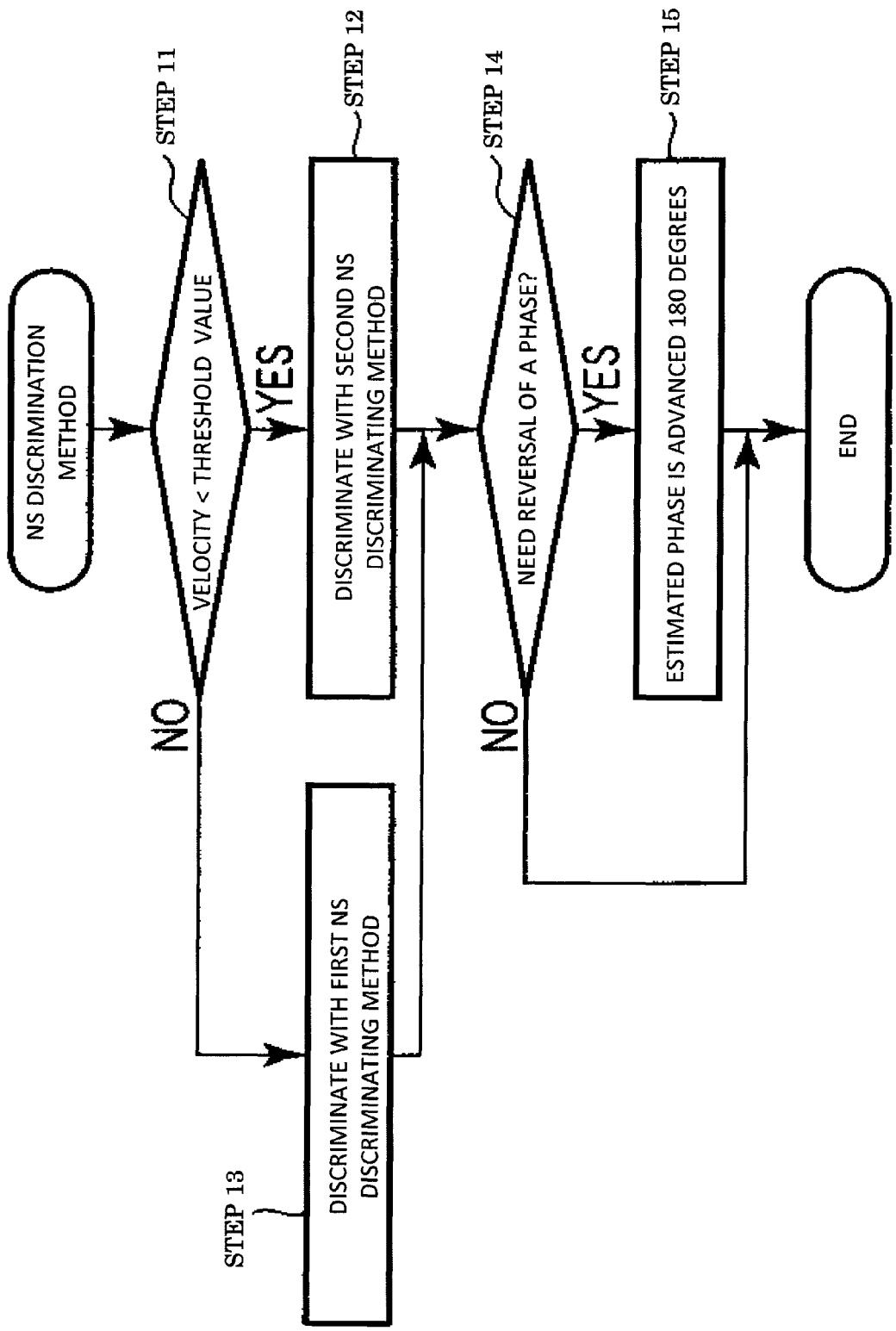
FIG. 8 is a flow chart which shows operation of a third embodiment.

The motor controlling device of a third embodiment is explained. This embodiment is related with NS (north pole/south pole) discriminating method of the rotor of a permanent magnet synchronous motor. FIG. 8 is a flow chart which shows operation of a third embodiment.

At Step 11, one of a plurality of NS discriminating methods is chosen according to angular velocity. Two discriminating methods are shown by FIG. 8. However, one method may be chosen from three or more NS discriminating methods by angular velocity. At Step 12, NS distinction is carried out with a first NS discriminating method. The first NS discriminating method is described later.

At Step 13, NS distinction is carried out with a second NS discriminating method. The second NS distinguishing method is also described later. At Step 14, as a result of distinguishing at Steps 12 and 13, it is determined whether reversal of a phase is required. At Step 15, when it is determined at Step 14 that reversal is required, an estimated phase is advanced 180 degrees and a phase is reversed (naturally, it may delay 180 degrees). After Step 15, the NS distinction routine is at an end.

The first NS distinguishing method will now be explained. The first NS distinguishing method is a method using magnetic saturation. The voltage of positive/negative is applied in the direction of the d-axis of an estimated coordinate system, and NS distinction is performed. In NS distinction, N and S are distinguished using the amplitude of the current difference which arises by magnetic saturation in the N pole and the S pole.

Figure 9:
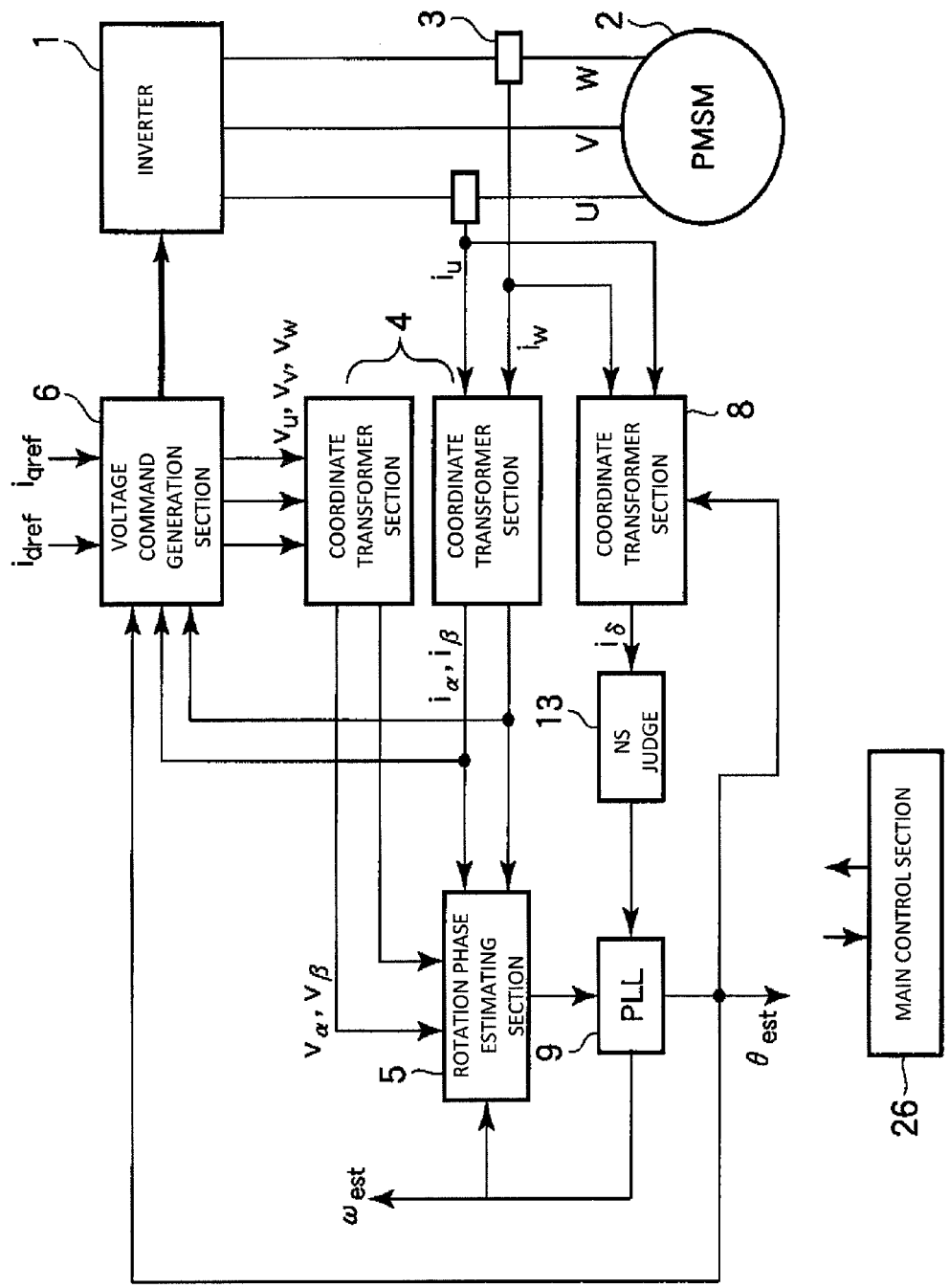
FIG. 9 is a block lineblock diagram of the system which adopts the second NS distinguishing method.

Next, the second NS distinguishing method is a method using the induction voltage related to this embodiment. Details including an effect are explained below. Certain features of the system which adopts the NS distinguishing method of a second is shown in FIG. 9. Although fundamental composition is the same as that of Embodiment 1, coordinate transformation section 8, NS determination part 13, and PLL 9 is added.

Figure 10:
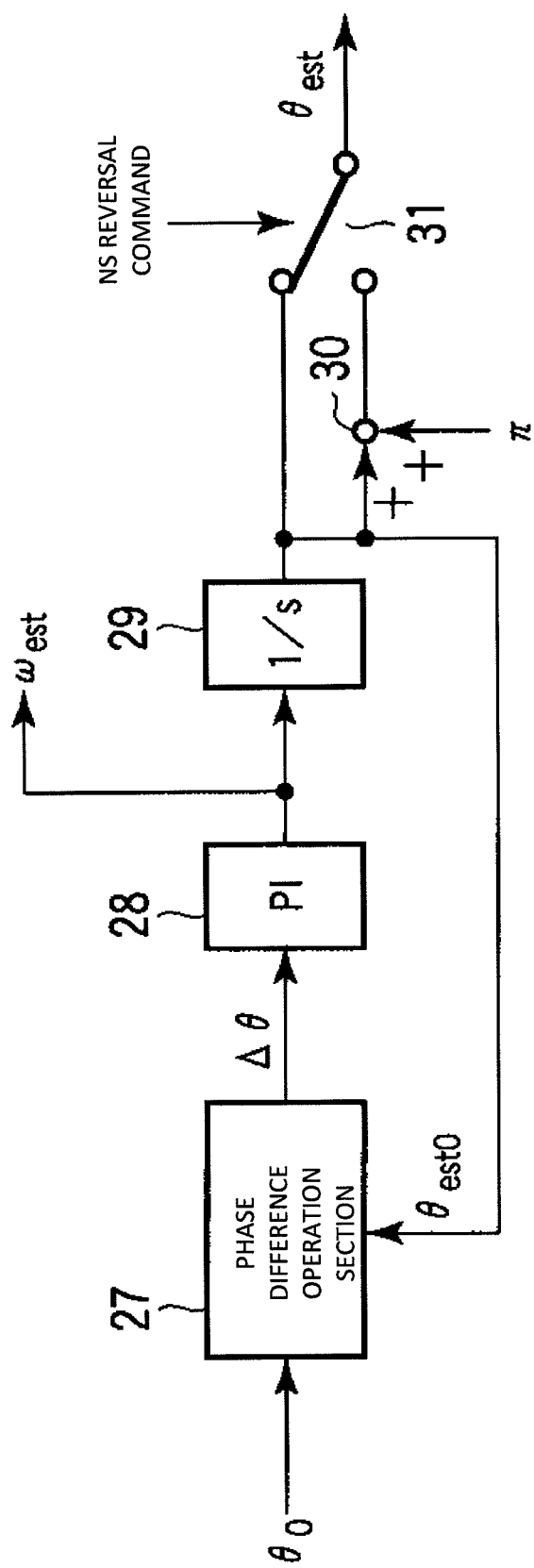
FIG. 10 is a block diagram showing certain features of PLL (Phase-Locked Loop) 9.

FIG. 10 is a block diagram showing certain features of PLL 9. Phase difference operation section 27 calculates phase difference $\Delta\theta$ of estimated phase $\theta_{est0}$ inputted from rotation phase estimating section 5, and estimated phase $\theta_{est0}$ which are the output signals of a self-circuit. PI (proportional-integral) control section 28 performs PI control according to phase difference $\Delta\theta$, and provides estimated angular velocity $\omega_{est}$.

Integrating section 29 is integrated with estimated angular velocity $\omega_{est}$, and estimated phase $\theta_{est0}$ is outputted. Adding machine 30 adds $\pi$ it to estimated phase $\theta_{est0}$. Switch 31 chooses one side of estimated phase $\theta_{est0}$ and estimated phase $\theta_{est0}$ adding it according to NS reversal command, and outputs estimated phase $\theta_{est}$. It is connected to each above-mentioned block, and main control section 26 controls this motor controlling device synchronously.

Next, NS distinction related to this embodiment is explained. This NS distinction has distinguished NS from $\delta$ axis current of the estimated coordinate system equivalent to q-axis current of d-q coordinate system. First, formula (4) and (5) of a first embodiment is indicated again.

$$E_{0x} = (L_d - L_q)(\omega i_d - p i_q) + \omega \Phi_f \qquad (4)$$
$$= (L_d - L_q)(\omega(i_\alpha \cos\theta + i_\beta \sin\theta) - p(i_\alpha \sin\theta + i_\beta \cos\theta)) + \omega \Phi_f$$

$$\begin{cases} e_\alpha = -E_{0x}\sin\theta = v_\alpha - (R_m + pL_d)i_\alpha - \omega(L_d - L_q)i_\beta \\ e_\beta = E_{0x}\cos\theta = v_\beta + \omega(L_d - L_q)i_\alpha - (R_m + pL_d)i_\beta \\ \theta = -\tan^{-1}(e_\alpha / e_\beta) \end{cases} \qquad (5)$$

When estimating a phase using a formula (5), the numerals of $E_{0x}$ may also change with the numerals of a current differentiation paragraph like a formula (4), and estimated phase $\theta$ may be calculated with a value opposite 180 degrees. Therefore, as shown in FIG. 10, the phase currently kept by PLL in the case of PLL may also become a value opposite 180 degrees, and is not depended on angular velocity, but NS distinction is required.

Usually, a low-speed range uses NS distinction, because induction voltage is small, the method using magnetic saturation is used widely, but in the method of using magnetic saturation, the time for causing magnetic saturation is needed for NS distinction. In the above-mentioned high-voltage state (no-load induction voltage is a field more than the voltage by the side of a direct current of an inverter), it is necessary to feed negative current through d-axis but so that magnetic flux may be weakened and voltage may be dropped, and when the phase is estimated by the value opposite 180 degrees, positive current will flow into d-axis and voltage will be increased conversely. Thus, there may be excess voltage if NS distinction is not performed early.

Here, in the field where voltage is large (angular velocity is a high speed), using it, because induction voltage can be used can perform NS distinction like the above-mentioned high-voltage state in a short time. However, sufficient accuracy is not likely because induction voltage is very small at a low speed. Therefore, there are two methods: NS discriminating method suitable for a low-speed area; and NS discriminating method suitable for a high-speed region. And it is good to perform NS distinction for a short time in a high-speed region.

These are the main features of a third embodiment. Hereafter, the NS distinguishing method in a third embodiment is explained. When current tracking type PWM is used in the range where induction voltage is large, voltage will be chosen in the direction which negates no-load induction voltage.

Therefore, the direction where most voltage vectors are chosen, for example, turns into a direction which negates no-load induction voltage.

Figure 11:
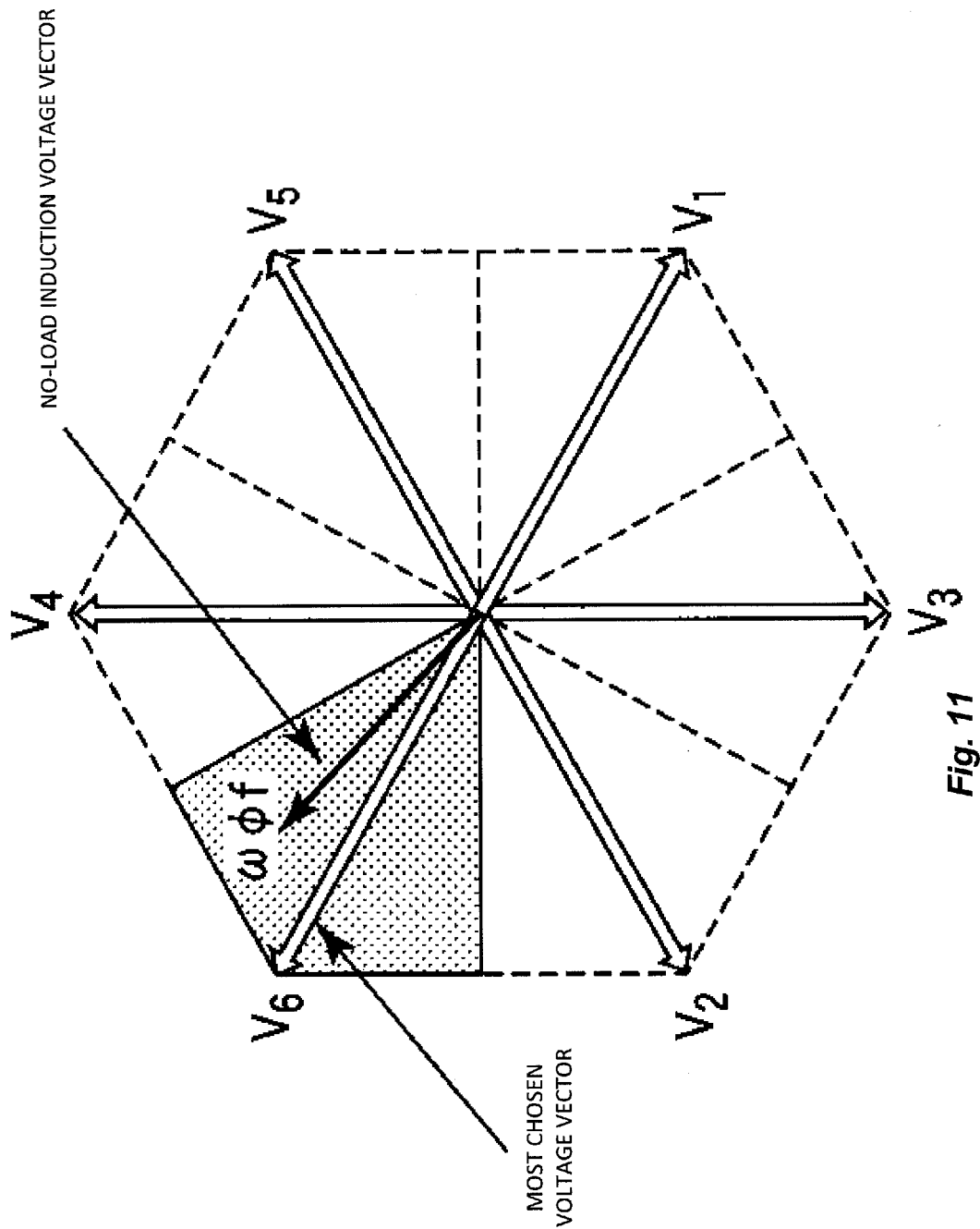
FIG. 11 is a vector diagram showing no-load induction voltage.
Figure 12:
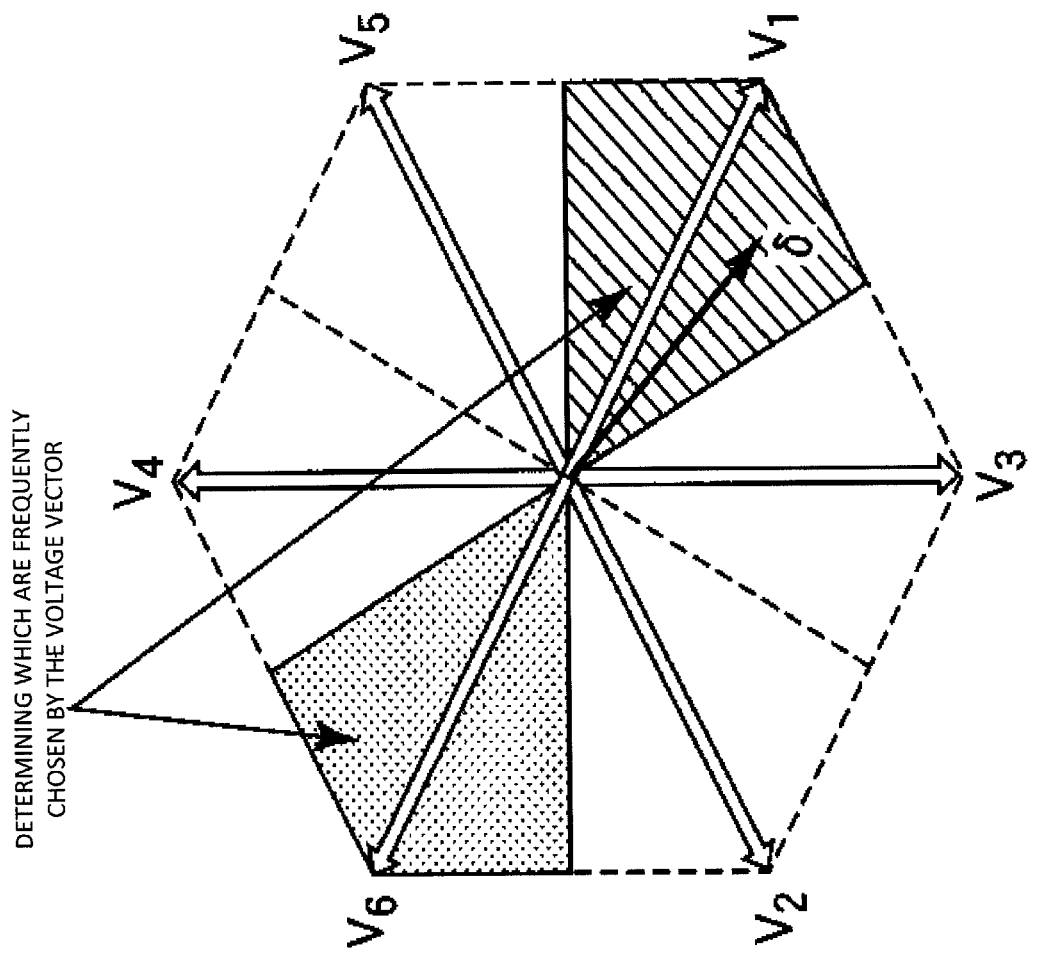
FIG. 12 is a vector diagram for explaining other NS (north pole/south pole) discriminating methods.

The direction of no-load induction voltage can be estimated from the direction where most voltage vectors are chosen (refer to FIG. 11). In this case, although a direction of no-load induction voltage cannot be estimated with sufficient accuracy, sufficient accuracy for NS distinction is acquired. NS distinction may be determined by the direction most frequently chosen by the voltage vector nearest to δ-axis corresponding to q-axis and a voltage vector opposite by 180 degrees (refer to FIG. 12).

Figure 13:
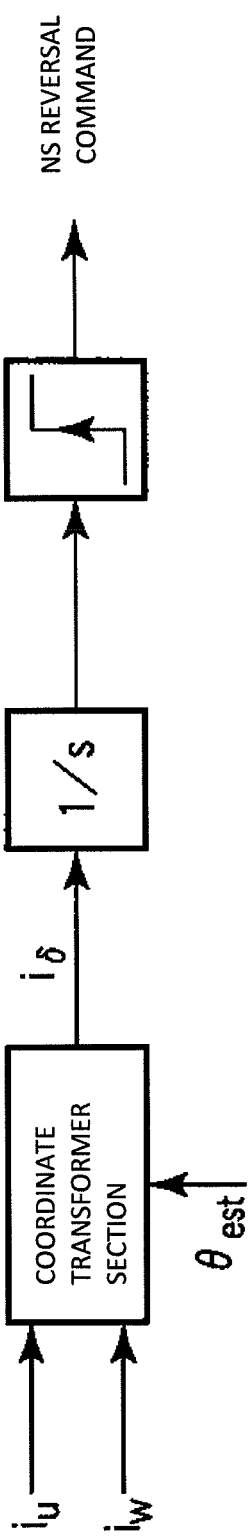
FIG. 13 is a block diagram showing certain features which judges the necessity for NS distinction.

Next, another NS distinction method is explained. At current tracking type PWM, above a certain amount of angular velocity, current will flow with no-load induction voltage, and it will be stopped by a voltage vector. Therefore, the mean vector of current serves as the direction of q-axis which is the direction of current through which it flows with no-load induction voltage. Therefore, FIG. 13 shows an example of when the inverter controls a synchronous machine and integrates with a δ-axis current corresponding to a q-axis. And, if the value which integrated with δ axis current becomes more than a certain threshold, it can be determined that NS distinction is required.

Or it can also distinguish using the average value of δ axis current.

Figure 14:
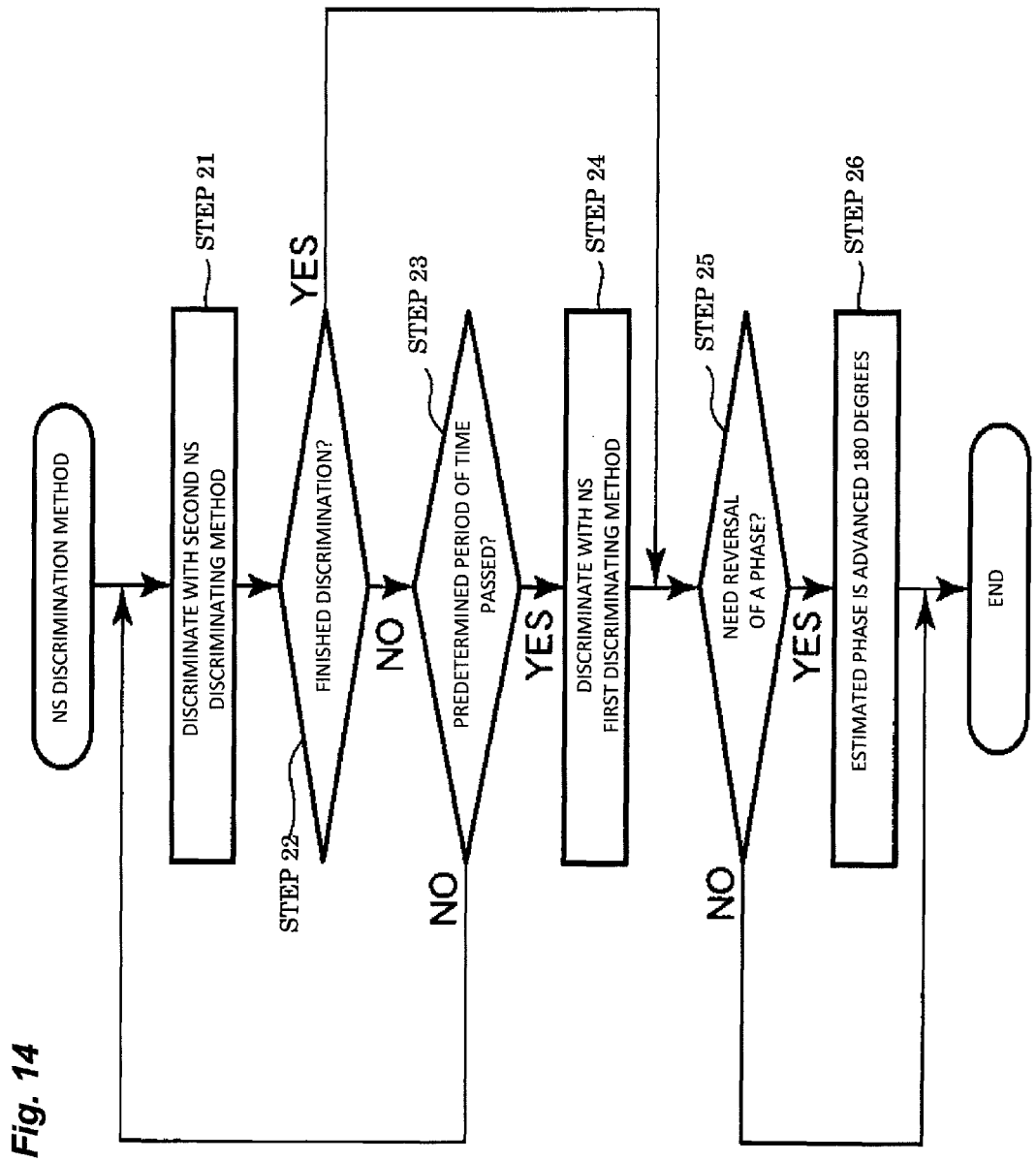
FIG. 14 is a flow chart of operation of NS distinction.

The flow chart of NS distinction here can also be considered as FIG. 8 and FIG. 14. Next, in FIG. 14, NS distinction is carried out with the second NS discriminating method at Step 21. This is the same as that of Step 13. At Step 22, it is determined whether NS distinction has been decided at Step 21. It is determined whether NS distinction has been decided by either requiring reversal or identifying the right position as reversal was not performed.

At Step 23, it is determined whether a predetermined period of time passed. If distinction is not made with the second NS distinguishing method even if it goes through a definite period of time, it shifts to Step 24. At Step 24, NS distinction is carried out with the first NS discriminating method. This is the same as that of Step 12. At Step 25, as a result of distinguishing at Steps 21 and 24, it is determined whether reversal of a phase is required. This is the same as that of Step 14.

In Step 26, when it is determined by Step 25 that reversal is required, an estimated phase is advanced 180 degrees and a phase is reversed. (Naturally, it may be delayed by 180 degrees.) This is the same as that of Step 15. Then, the NS distinction routine is at an end. Although this embodiment indicated PMSM, the same effect is acquired even if it is a synchronous machine which uses an electromagnet for a rotor. However, in the case of a permanent magnet synchronous motor, where magnetic flux cannot be adjusted, an even greater effect is produced for a reboot from a free run.

Fourth Embodiment

Figure 15:
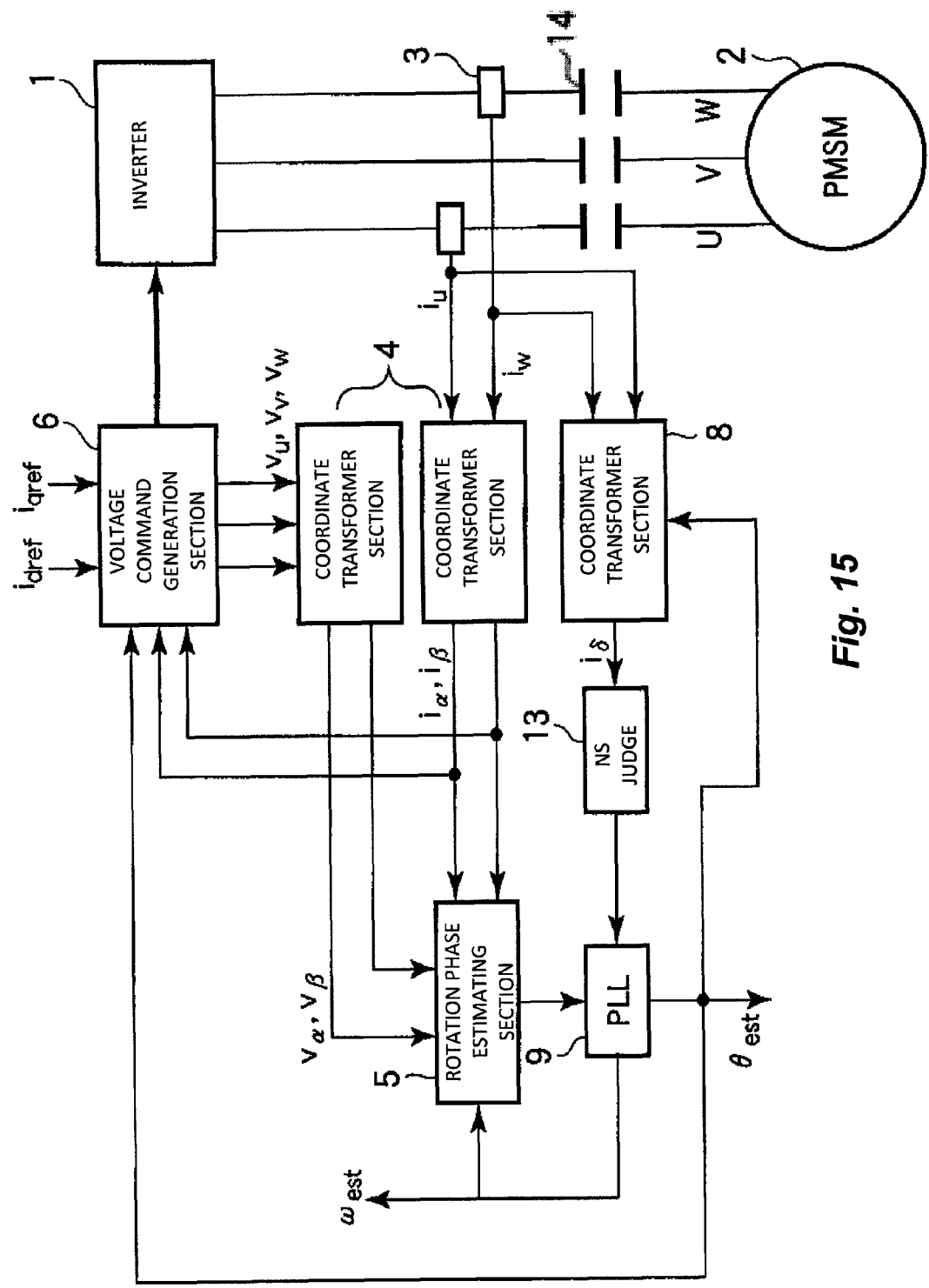
FIG. 15 is a block diagram showing certain features of a fourth embodiment.

Next, the motor controlling device of a fourth embodiment is described. FIG. 15 is a block diagram showing certain features of a fourth embodiment. Certain features of a fundamental system is the same as that of a third embodiment of FIG. 9. In the motor controlling device of this embodiment, the load contact machine is connected between motor 2 and inverter 1, and it has a structure which can open motor 2 and inverter 1 with a load contact machine. Although the load contact machine is connected with the current detector between PMSM(s) in FIG. 15, a load contact machine may be connected between a current detector and inverter 1.

When rebooting in the above-mentioned high-voltage state, no-load induction voltage is larger than the voltage at the DC side of inverter 1. At that point, in a high-voltage state, a winding current flows into the inverter at the moment of closing a load contact machine even though inverter 1 is in the OFF state, when the DC current of inverter 1 flows, or when the voltage at the DC side of inverter 1 is changed. Therefore, it can be determined as a high-voltage state by detecting these cases.

When a high-voltage state is detected, it is necessary to feed negative current in the direction of magneto magnetic flux so that no-load induction voltage may be controlled. When closing a load contact machine and rebooting especially, there is also the possibility that no-load induction voltage is much larger than the voltage at the DC side of inverter 1. Therefore, a weakening current must be high so that it may reduce the no-load induction voltage at the time of the maximum speed. Also in the maximum high speed, voltage rise control is enabled by setting the weakening current according to the following formula.

$$i_{dref} \leq \frac{1}{L_d} \left( \frac{V_{dc}}{\sqrt{2}\,\omega_{max}} - \Phi_f \right) \quad (6)$$

However, $L_d$ is the inductance of the direction of magneto magnetic flux. $\omega_{max}$ is the highest angular velocity $V_{dc}$ is the voltage by the side of a direct current of inverter 1 obtained by the above-mentioned DC voltage detecting means. $\Phi_f$ is the magnetic flux of a permanent magnet.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. Also, the terms in the claims have their plain, ordinary meaning unless otherwise explicitly and clearly defined by the patentee. The indefinite articles "a" and "an," as used in the claims, are each defined herein to mean one or more than one of the element that the indefinite article introduces.

What is claimed is:

1. A control device of a synchronous machine comprising:
an inverter configured to provide an output current to drive the synchronous machine;
a controller configured to generate a gate command,
wherein the gate command controls the output current,
wherein the controller comprises a current tracking pulse width modulation method controller and a voltage type pulse width modulation method controller,
wherein the current tracking pulse width modulation method controller only chooses a non-zero vector and generates the gate command by using the chosen non-zero vector at a time when the inverter transitions from not driving the synchronous machine with the output current to driving the synchronous machine,
wherein the voltage type pulse width modulation method controller is configured to control the output current of the inverter at a time after the inverter transitions to driving the synchronous machine; and a phase angle and angular velocity estimating section configured to estimate a phase angle and an angular velocity of a rotor of the synchronous machine based, at least in part, on an inductance value, an induction voltage value, the gate command, and the output current to be supplied to the synchronous machine;

wherein the controller is further configured to control the output current based, at least in part, on the phase angle and the angular velocity.

2. The control device according to claim 1, wherein:
the controller is configured to direct the output current in a direction of magnetic flux of the synchronous machine at a time when the inverter transitions to driving the synchronous machine with the output current.

3. The control device according to claim 2, wherein:
the controller is configured to:
compare a no-load induction voltage of the synchronous machine and a direct side voltage of the inverter; and
control the output current of the inverter to direct the output current in a negative direction of magnetic flux of the rotor.

4. The control device according to claim 3, further comprising:
a load contact machine configured to connect the inverter and the synchronous machine;
wherein the controller is configured to control the output current to flow in a negative direction, when the no-load induction voltage of the synchronous machine is greater than the direct side voltage of the inverter.

5. The control device according to claim 1, wherein:
at a time when the inverter starts the synchronous machine with the output current, the current tracking pulse modulation method controller is configured to control the inverter to provide a current control response.

6. The control device according to claim 1, further comprising:
a judging device configured to determine whether a direction of magnetic flux is aligned with an N pole or an S pole.

7. A method of controlling a synchronous machine, comprising:
configuring an inverter to provide an output current to a synchronous machine;
providing a current tracking pulse width modulation method controller and a voltage type pulse width modulation method controller, wherein:
the current tracking pulse width modulation method controller is configured to control the output current of the inverter at a time when the inverter transitions from not driving the synchronous machine with the output current to driving the synchronous machine; and
the voltage type pulse width modulation method controller is configured to control the output current of the inverter a time after the inverter transitions to driving the synchronous machine;
choosing only a non-zero vector for generating a gate command;
generating the gate command based on the current tracking pulse width modulation method by using the chosen non-zero vector;
estimating a phase angle and an angular velocity of a rotor of the synchronous machine based, at least in part, on an inductance value, an induction voltage value, the gate command, and the output current to be supplied to the synchronous machine; and
controlling of the output current based, at least in part, on the phase angle and the angular velocity.

8. The method of claim 7, further comprising:
directing the output current in a direction of magnetic flux of the synchronous machine at a time when the inverter transitions to driving the synchronous machine with the output current.

9. The method of claim 8, further comprising:
comparing a no-load induction voltage of the synchronous machine and a direct side voltage of the inverter; and
controlling the output current of the inverter to direct the output current in a negative direction of magnetic flux of the rotor.

10. The method of claim 9, further comprising:
configuring a load contact machine to connect the inverter and the synchronous machine; and
controlling the output current to flow in a negative direction, when the no-load induction voltage of the synchronous machine is greater than the direct side voltage of the inverter.

11. The method of claim 7, further comprising:
controlling the inverter to provide a current control response at a time when the inverter starts the synchronous machine with the output current.

12. The method of claim 7, further comprising:
determining whether a direction of magnetic flux is aligned with an N pole or an S pole.

13. A control device for a synchronous motor comprising:
an inverter which generates a current to drive the synchronous motor; and
a control unit,
wherein the control unit includes:
a current detector which detects a current between the inverter and the synchronous motor;
a phase estimation section which estimates a rotation phase based on a detected current by the current detector; and
a command generator which generates, based on the detected current and an estimated rotation phase, a gate command to the inverter so as to drive the synchronous motor,
wherein the command generator selects only a non-zero vector and generates the gate command for starting the inverter by performing a current-tracking-type PWM during a free-run state, and
wherein the command generator generates the gate command by performing a voltage-modulating-type PWM after starting of the inverter from the free-run state is completed.

14. The control device according to claim 13, wherein
the command generator selects the only non-zero vector to generate the gate command for starting the inverter during a free-run state when a high-voltage state is detected.

* * * * *